United States Patent
Kim et al.

(10) Patent No.: US 11,560,128 B2
(45) Date of Patent: Jan. 24, 2023

(54) ELECTRONIC BRAKE SYSTEM

(71) Applicant: HL MANDO CORPORATION, Pyeongtaek (KR)

(72) Inventors: Sang Hoon Kim, Seoul (KR); Seong Ho Choi, Anyang (KR)

(73) Assignee: HL MANDO CORPORATION, Pyeongtaek (KR)

( * ) Notice: Subject to any disclaimer, the term of this patent is extended or adjusted under 35 U.S.C. 154(b) by 0 days.

(21) Appl. No.: 17/271,211

(22) PCT Filed: Aug. 27, 2019

(86) PCT No.: PCT/KR2019/010958
§ 371 (c)(1),
(2) Date: Feb. 25, 2021

(87) PCT Pub. No.: WO2020/045970
PCT Pub. Date: Mar. 5, 2020

(65) Prior Publication Data
US 2021/0339726 A1 Nov. 4, 2021

(30) Foreign Application Priority Data
Aug. 27, 2018 (KR) ........................ 10-2018-0100425

(51) Int. Cl.
*B60T 13/66* (2006.01)
*B60T 7/04* (2006.01)
(Continued)

(52) U.S. Cl.
CPC ............ *B60T 13/662* (2013.01); *B60T 7/042* (2013.01); *B60T 13/745* (2013.01);
(Continued)

(58) Field of Classification Search
CPC ........ B60T 7/042; B60T 8/171; B60T 13/662; B60T 13/745; B60T 17/225; B60T 2270/402; B60T 2270/406
See application file for complete search history.

(56) References Cited

U.S. PATENT DOCUMENTS 8,246,122 B2 *  8/2012  Yamamoto ............ B60T 8/4081
                                                  303/122.1
8,708,429 B2 *  4/2014  Maury .................. B60T 13/745
                                                     303/20

(Continued)

FOREIGN PATENT DOCUMENTS

JP        2001-165303 A      6/2001
JP        2009-113605 A      5/2009
(Continued)

OTHER PUBLICATIONS

International Search Report dated Jan. 6, 2020.

*Primary Examiner* — Thomas E Lazo
(74) *Attorney, Agent, or Firm* — Harvest IP Law LLP (57) ABSTRACT

The present disclosure relates to a control method of a brake system including a reservoir in which oil is stored, wherein the control method includes detecting a first level of a liquid level of oil stored in the reservoir, detecting a second level of the liquid level of oil stored in the reservoir, determining a decrease trend of an oil amount stored in the reservoir based on a time point when the first level is detected and a time point when the second level is detected, and limiting at least one additional function based on the decrease trend of the oil amount.

15 Claims, 5 Drawing Sheets

(51) Int. Cl.
*B60T 13/74* (2006.01)
*B60T 17/22* (2006.01)

(52) U.S. Cl.
CPC ....... *B60T 17/225* (2013.01); *B60T 2270/402* (2013.01); *B60T 2270/406* (2013.01)

(56) References Cited

U.S. PATENT DOCUMENTS

| | | | |
|---|---|---|---|
| 9,616,871 B2 * | 4/2017 | Kim | B60T 8/4072 |
| 2016/0023644 A1 * | 1/2016 | Feigel | B60T 8/4081 |
| | | | 303/3 |
| 2017/0015290 A1 * | 1/2017 | Oosawa | B60T 13/146 |

FOREIGN PATENT DOCUMENTS

| | | | | |
|---|---|---|---|---|
| JP | 2009-286289 A | | 12/2009 | |
| JP | 2009286289 A | * | 12/2009 | |
| JP | 2010-185488 A | | 8/2010 | |
| JP | 2015-182631 A | | 10/2015 | |
| KR | 19990020860 A | | 3/1999 | |
| KR | 1020130102059 A | | 9/2013 | |
| KR | 101661885 B1 | | 10/2016 | |
| WO | WO-2016096533 A1 | * | 6/2016 | ............. B60T 13/14 |
| WO | 2018130406 A1 | | 7/2018 | |

\* cited by examiner

ELECTRONIC BRAKE SYSTEM

CROSS-REFERENCE TO RELATED APPLICATIONS

This application is a National Stage of International Application No. PCT/KR2019/010958 filed Aug. 27, 2019, claiming priority based on Korean Patent Application No. 10-2018-0100425 filed Aug. 27, 2018.

TECHNICAL FIELD

The present disclosure relates to an electronic brake system that generates a braking force according to an electrical signal corresponding to a displacement of a brake pedal.

BACKGROUND ART

Recently, electronic brake systems have been developed that generate a brake pressure using a motor and generate a braking force using the motor.

When oil leaks in an electronic brake system, the amount of oil in a reservoir may decrease. The amount of oil in the reservoir may be detected through a level sensor installed inside the reservoir, and an appropriate braking mode may be performed depending on the amount of oil in the reservoir. For example, when the amount of oil in the reservoir decreases below a preset lower limit, a fall back mode in which a driver may directly brake may be performed.

DISCLOSURE

Technical Problem

The present disclosure is directed to providing an electronic brake system capable of securing the maximum braking force even in a situation in which the amount of oil in a reservoir decreases due to oil leakage.

Technical Solution

An aspect of the present disclosure provides a control method of a brake system including a reservoir in which oil is stored, wherein the control method includes detecting a first level of a liquid level of oil stored in the reservoir, detecting a second level of the liquid level of oil stored in the reservoir, determining a decrease trend of an oil amount stored in the reservoir based on a time point when the first level is detected and a time point when the second level is detected, and limiting at least one additional function based on the decrease trend of the oil amount.

The limiting the at least one additional function may include determining one of at least one additional function causing a change in a required liquid amount as a limiting function based on the decrease trend of the oil amount and limiting the determined limiting function.

The limiting the at least one additional function may include limiting at least one automatic control function when the first level is detected.

The control method may further include determining a boosting possible time based on the decrease trend of the oil amount in the reservoir, wherein the limiting at least one additional function may include limiting the at least one additional function based on the boosting possible time.

The determining the boosting possible time may include determining an oil reduction amount according to a required liquid amount from a time point when the first level is detected to a time point when the second level is detected, and determining the boosting possible time based on the oil reduction amount according to the required liquid amount.

The determining the boosting possible time may include determining at least one of an oil reduction rate of the reservoir and a boosting possible required liquid amount based on an oil reduction amount according to a required liquid amount from a time point when the first level is detected to a time point when the second level is detected, and determining the boosting possible time based on at least one of the determined oil reduction rate and boosting possible required liquid amount.

The determining the boosting possible time may include accumulating a required liquid amount and an oil reduction amount from a time point when the first level is detected to a time point when the second level is detected, and determining the oil reduction amount according to the required liquid amount based on at least one of the accumulated required liquid amount and oil reduction amount, and braking information.

The braking information may include at least one of a braking time, a number of braking, a braking mode, and a braking cycle.

The control method may further include performing a fall back mode using a pressure in a master cylinder generated by a brake pedal operation of a driver after the boosting possible time.

Another aspect of the present disclosure provides a control method of a brake system including a reservoir in which oil is stored and a hydraulic pressure supply device to generate hydraulic pressure by moving a piston using a rotational force of a motor, wherein the control method includes detecting a first level of a liquid level of oil stored in the reservoir, detecting a second level of the liquid level of oil stored in the reservoir, determining a decrease trend of an oil amount stored in the reservoir based on a time point when the first level is detected and a time point when the second level is detected, and driving the motor to move the piston within a stroke range of the piston determined based on the decrease trend of the oil amount.

The driving the motor may include controlling at least one of a speed or a rotation amount of the motor so that the piston moves within the stroke range.

The driving the motor may include determining a boosting possible required liquid amount based on the decrease trend of the oil amount, and determining the stroke range of the piston based on the determined boosting possible required liquid amount.

The control method may further include limiting at least one of a maximum pressure, a pressurization method and a speed of the motor when the second level is detected.

The control method may further include blocking a circuit in which a leak occurs when the second level is detected.

The control method may further include determining a boosting possible time based on the decrease trend of the oil amount in the reservoir, wherein the driving the motor may include driving the motor to move the piston within a stroke range of the piston during the boosting possible time.

The determining the boosting possible time may include determining an oil reduction amount according to a required liquid amount from a time point when the first level is detected to a time point when the second level is detected, and determining the boosting possible time based on the oil reduction amount according to the required liquid amount.

Another aspect of the present disclosure provides an electronic brake system including a reservoir in which oil is stored, a master cylinder connected to the reservoir to discharge oil according to a pressing force of a brake pedal, a hydraulic pressure supply device configured to generate hydraulic pressure by moving a piston using a rotational force of a motor and supply the generated hydraulic pressure to a wheel cylinder provided on each of wheels, a hydraulic control device configured to transfer the hydraulic pressure discharged from the hydraulic pressure supply device to the wheel cylinder provided on each of the wheels, a first level sensor to detect a first level of a liquid level of oil stored in the reservoir, a second level sensor to detect a second level of the liquid level of oil stored in the reservoir, and an electronic control unit configured to determine a decrease trend of an oil amount in the reservoir based on detection signals from the first level sensor and the second level sensor, limit at least one additional function based on the decrease trend of the oil amount, and control the motor based on the decrease trend of the oil amount when the second level is detected.

Advantageous Effects

According to an embodiment of the present disclosure, because a braking force can be efficiently secured even in an oil leak situation, driving safety can be improved.

MODE OF THE DISCLOSURE

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration. Like reference numbers or signs in the various drawings of the application represent parts or components that perform substantially the same functions.

Figure 1:
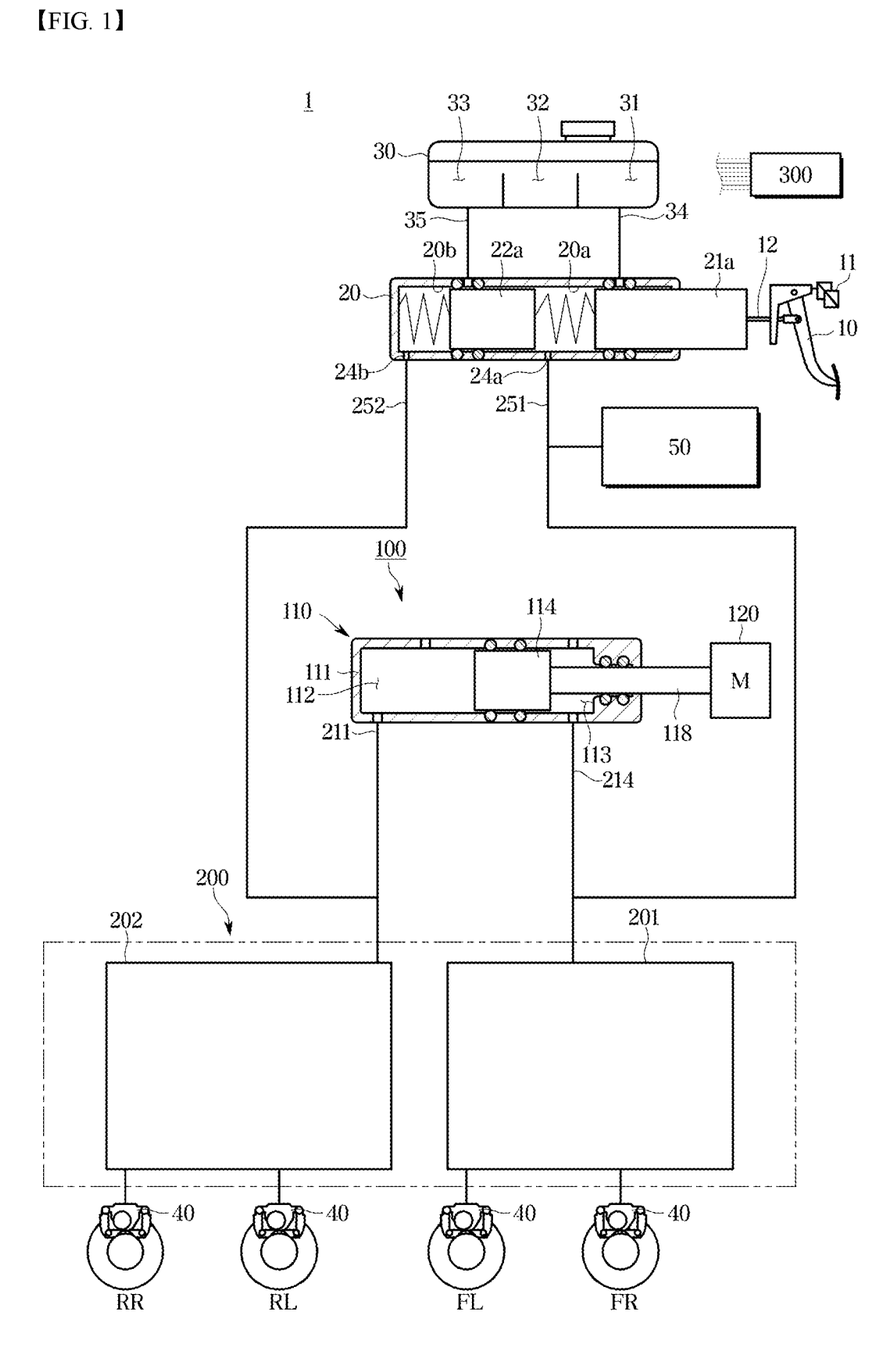
FIG. 1 is a view schematically illustrating an electronic brake system according to an embodiment in a non-braking state.

FIG. 1 is a view schematically illustrating an electronic brake system according to an embodiment in a non-braking state.

Referring to FIG. 1, an electronic brake system 1 may include a master cylinder 20 to generate hydraulic pressure, a reservoir 30 disposed above the master cylinder 20 to store oil, an input rod 12 to press the master cylinder 20 by a pedal effort of a brake pedal 10, a wheel cylinder 40 to brake each of wheels RR, RL, FR, and FL by receiving the hydraulic pressure, a pedal displacement sensor 11 to detect displacement of the brake pedal 10, and a simulation device 50 to provide a reaction force in response to the pedal effort of the brake pedal 10.

The master cylinder 20 may include a first master chamber 20a and a second master chamber 20b. A first piston 21a connected to the input rod 12 may be provided in the first master chamber 20a, and a second piston 22a may be provided in the second master chamber 20b. The first master chamber 20a may communicate with a first hydraulic port 24a to allow oil to flow in and out, and the second master chamber 20b may communicate with a second hydraulic port 24b to allow oil to flow in and out. The first hydraulic port 24a may be connected to a first backup flow path 251, and the second hydraulic port 24b may be connected to a second backup flow path 252. The first master chamber 20a may be connected to the reservoir 30 through a first reservoir flow path 34. The second master chamber 20b may be connected to the reservoir 30 through a second reservoir flow path 35.

The reservoir 30 may include three reservoir chambers 31, 32, and 33. The three reservoir chambers 31, 32, and 33 may be arranged side by side in one row. The reservoir chambers 31, 32, and 33 adjacent to each other may be separated by partition walls. Each of the partition walls is partially open so that the first to third reservoir chambers 31, 32, and 33 may communicate with each other.

The first reservoir chamber 31 may be connected to the first master chamber 20a of the master cylinder 20, the wheel cylinders 40, and the simulation device 50. The first reservoir chamber 31 may be connected to two of the four wheel cylinders 40, for example, the wheel cylinders 40 of a first hydraulic circuit 201 provided on the left front wheel FL and the right front wheel FR.

The second reservoir chamber 32 may be connected to a hydraulic pressure supply device 100. The second reservoir chamber 32 may be connected to the first pressure chamber 112 and the second pressure chamber 113 of a hydraulic pressure providing unit 110 in the hydraulic pressure supply device 100.

The third reservoir chamber 33 may be connected to the second master chamber 20b of the master cylinder 20 and the wheel cylinders 40. The third reservoir chamber 33 may be connected to the other two of the four wheel cylinders 40, for example, the wheel cylinders 40 of a second hydraulic circuit 202 provided on the right rear wheel RR and the left rear wheel RL.

The simulation device 50 may be connected to the first backup flow path 251 to provide a reaction force in response to the pedal effort of the brake pedal 10.

The electronic brake system 1 may also include the hydraulic pressure supply device 100 configured to mechanically operate by receiving a driver's braking intention as an electrical signal from the pedal displacement sensor 11 detecting the displacement of the brake pedal 10, and an electronic control unit 300 configured to perform overall control of a system for controlling the hydraulic pressure supply device 100 and one or more valves based on hydraulic pressure information and pedal displacement information of a hydraulic control device 200 including the first and second hydraulic circuits 201 and 202 that control the flow of hydraulic pressure transferred to each of the wheel cylinders 40.

The hydraulic pressure supply device 100 may include the hydraulic pressure providing unit 110 to provide oil pressure transferred to the wheel cylinders 40, and a motor 120 to provide a driving force for operating the hydraulic pressure providing unit 110.

The hydraulic pressure providing unit 110 may include a cylinder block 111 in which the pressure chambers 112 and 113 for receiving and storing oil are formed, a hydraulic piston 114 accommodated in the cylinder block 111, and a driving shaft 118 connected to a rear end of the hydraulic piston 114 to transmit power provided from the motor 120 to the hydraulic piston 114.

The pressure chambers 112 and 113 may include the first pressure chamber 112 positioned in front of the hydraulic piston 114 (forward direction; left direction of the drawing), and the second pressure chamber 113 positioned in rear of the hydraulic piston 114 (rearward direction; right direction of the drawing). That is, the first pressure chamber 112 may be partitioned by the cylinder block 111 and a front end of the hydraulic piston 114 so that the volume thereof may be changed depending on the movement of the hydraulic piston 114. Also, the second pressure chamber 113 may be partitioned by the cylinder block 111 and a rear end of the hydraulic piston 114 so that the volume thereof may be changed depending on the movement of the hydraulic piston 114.

The first pressure chamber 112 is connected to a first hydraulic flow path 211. The second pressure chamber 113 is connected to a fourth hydraulic flow path 214.

The first hydraulic flow path 211 connects the first pressure chamber 112 and the first and second hydraulic circuits 201 and 202.

The fourth hydraulic flow path 214 connects the second pressure chamber 113 and the first and second hydraulic circuits 201 and 202.

The first and second pressure chambers 112 and 113 may receive and store oil from the reservoir 30, and the oil in the first or second pressure chambers 112 or 113 may be delivered to the reservoir 30.

The hydraulic pressure supply device 100 may perform a function of transferring hydraulic pressure to the wheel cylinder 40 or suctioning the hydraulic pressure and transferring it to the reservoir 30 by moving the hydraulic piston 114 in the forward direction or the reverse direction depending on a rotation direction of a rotational force generated from the motor 120.

The hydraulic control device 200 may include the first hydraulic circuit 201 and the second hydraulic circuit 202 receiving hydraulic pressure from the hydraulic pressure supply device 100.

The hydraulic circuits 201 and 202 may each include a plurality of inlet valves (not shown) to control the flow of hydraulic pressure.

The hydraulic circuits 201 and 202 may each include a plurality of outlet valves (not shown) connected to the reservoir 30 to improve performance when braking is released.

The hydraulic control device 200 may be connected to the backup flow paths 251 and 252. The first hydraulic circuit 201 may be connected to the first backup flow path 251 to receive hydraulic pressure from the master cylinder 20. The second hydraulic circuit 202 may be connected to the second backup flow path 252 to receive hydraulic pressure from the master cylinder 20.

Hereinafter, the operation of the electronic brake system 1 including the above-described components will be described in detail.

When braking is started by the driver, the required braking amount of the driver may be detected through information such as the pressure of the brake pedal 10 that the driver depresses through the pedal displacement sensor 11. The electronic control unit 300 drives the motor 120 by receiving an electrical signal output from the pedal displacement sensor 11.

Also, the electronic control unit 300 may grasp the magnitude of the amount of pressure increase or decrease in the wheel cylinder 40 by grasping the amount of braking required by the driver and the amount of regenerative braking by the motor 120 and calculating the magnitude of the amount of friction braking according to the difference between the braking amounts.

The electronic control unit 300 may control the operation of the hydraulic pressure supply device 100 to use a boosting mode divided into a low pressure mode and a high pressure mode. The low pressure mode and the high pressure mode may be changed by changing the operation of the hydraulic control device 200 or the hydraulic pressure supply device 100. The hydraulic pressure supply device 100 may generate a high hydraulic pressure without increasing the output of the motor 120 by using the high pressure mode.

In more detail, the hydraulic piston 114 generates hydraulic pressure in the first pressure chamber 112 while advancing. As the hydraulic piston 114 advances in an initial state, that is, as the stroke of the hydraulic piston 114 increases, the amount of oil transferred from the first pressure chamber 112 to the wheel cylinder 40 increases, thereby increasing the braking pressure. However, because there is an effective stroke of the hydraulic piston 114, there is the maximum pressure by the advance of the hydraulic piston 114.

In this case, the maximum pressure in the low pressure mode is less than the maximum pressure in the high pressure mode. However, in the high pressure mode, the pressure increase rate per stroke of the hydraulic piston 114 is small compared to the low pressure mode. This is because in the high pressure mode, not all of the oil pushed out of the first pressure chamber 112 flows into the wheel cylinder 40, but a part of the oil flows into the second pressure chamber 113.

In other words, the electronic control unit 300 may control a plurality of valves (not shown) of the hydraulic control device 200 or the hydraulic pressure supply device 100 so that in the low pressure mode, all of the oil pushed out of the first pressure chamber 112 flows into the wheel cylinder 40, and in the high pressure mode, a part of the oil pushed out of the first pressure chamber 112 flows into the second pressure chamber 113.

In addition to the high pressure mode and low pressure mode described above, the braking mode may include modes that provide various braking operations such as an ABS mode in which the operation of an anti-lock braking system (ABS) is performed, an ESC mode in which an electronic stability control (ESC) is performed, and a fall back mode for emergency braking.

When the ABS mode is performed, the electronic control unit 300 may control the plurality of valves (not shown) in the electronic brake system 1 so that hydraulic pressure is independently transmitted to or discharged from the wheel cylinder 40 of each of the wheels RR, RL, FR, and FL.

In the fall back mode, when the electronic brake system 1 does not operate normally, emergency braking may be performed using the pressure in the master cylinder 20 generated by a brake pedal operation of the driver.

When the electronic brake system 1 does not operate normally, at least one valve (not shown) included in the electronic brake system 1 may be provided in an initial braking state that is an inoperative state.

In the fall back mode, when the driver presses the brake pedal 10, the input rod 12 connected to the brake pedal 10 advances, and at the same time, the first piston 21a in contact with the input rod 12 advances, and the second piston 22*a* also advances by the pressure or movement of the first piston 21*a*.

The hydraulic pressure discharged from the master cylinder 20 by the pressure or movement of the first piston 21*a* and the second piston 21*b* is directly transferred to the wheel cylinder 40 through the first and second backup passages 251 and 252 connected for backup braking, thereby performing a braking force. Therefore, emergency braking may be performed in the case of system failure.

That is, when the fall back mode is performed, the electronic control unit 300 may control the plurality of valves (not shown) of the electronic brake system 1 so that the hydraulic pressure discharged from the master cylinder 20 is directly transferred to the four wheel cylinders 40.

Figure 2:
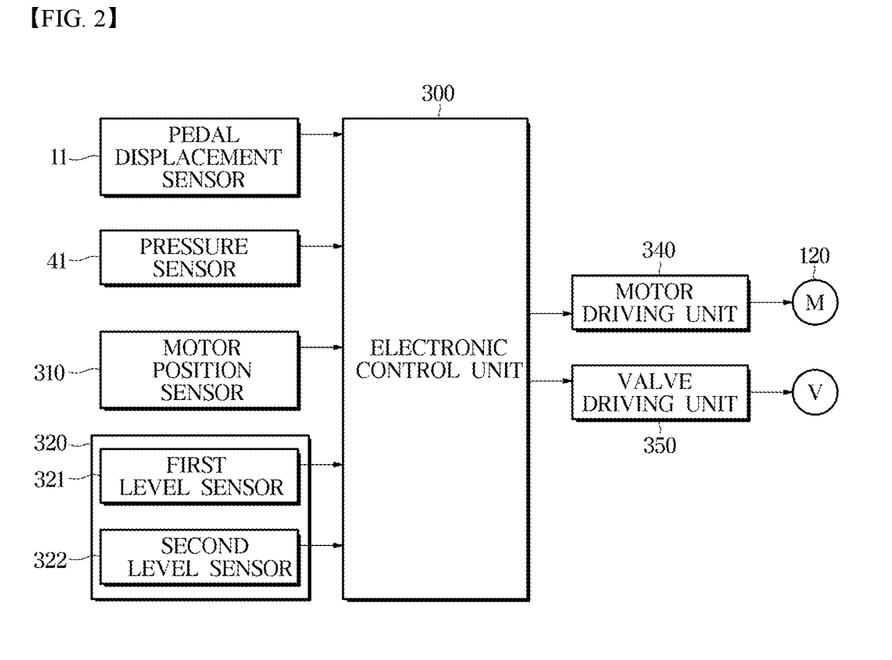
FIG. 2 is a schematic control block diagram of the electronic brake system according to an embodiment.

FIG. 2 is a schematic control block diagram of the electronic brake system according to an embodiment.

Referring to FIG. 2, the electronic brake system may include the electronic control unit (ECU) 300 that performs overall control.

The pedal displacement sensor 11, a pressure sensor 41, a motor position sensor 310, and a level detection device 320 are electrically connected to an input side of the electronic control unit 300.

A motor driving unit 340 and a valve driving unit 350 are electrically connected to an output side of the electronic control unit 300.

The pedal displacement sensor 11 is provided in the brake pedal 10 to detect the operation and displacement of the brake pedal 10. The pedal displacement information detected by the pedal displacement sensor 11 is delivered to the electronic control unit 300.

The pressure sensor 41 may include at least one of a hydraulic flow path pressure sensor (not shown) that detects the hydraulic pressure in the hydraulic circuits 201 and 202 or a backup flow path pressure sensor (not shown) that measures the oil pressure in the master cylinder 20.

The pressure sensor 41 may detect the hydraulic pressure transferred from the hydraulic pressure supply device 40 to the wheel cylinder 30 installed on the right rear wheel RR or the left rear wheel RL. The pressure sensor 41 may be provided at a position capable of detecting the hydraulic pressure transferred from the hydraulic pressure supply device 100 to the wheel cylinder 40 of the left front wheel FL and the right front wheel FR. The hydraulic circuit pressure information detected by the pressure sensor 41 is transmitted to the electronic control unit 300.

The motor position sensor 310 detects the position of a rotor of the motor 120. The motor rotor position information detected by the motor position sensor 310 is delivered to the electronic control unit 300.

The level detection device 320 may detect a level of oil stored in the reservoir 30. Specifically, the level detection device 320 may classify a level of oil stored in the reservoir 30 into one or more levels. For example, the level detection device 320 may classify a level of oil stored in the reservoir 30 into two levels. In this case, the level detection device 320 may detect an upper limit or a lower limit of a liquid level of oil stored in the reservoir 30.

To this end, the level detection device 320 may include at least one level sensor. The level sensor may be implemented as a sensor of various types for determining the level of oil stored in the reservoir 30.

For example, the level sensor may be divided into a continuous level sensor and a discrete level sensor depending on a measurement method. As continuous level sensors, there are sensors such as a buoyancy level sensor, a gravimetric level sensor, a pressure level sensor, a capacitive level sensor, an ultrasonic level sensor, a radiation level sensor, and a microwave level sensor. As discrete level sensors, there are sensors such as a conductivity type level sensor, a heat transfer type level sensor, a capacitive level sensor, an optical level sensor, an ultrasonic level sensor, and a microwave level sensor.

For example, as illustrated in FIG. 2, the level detection device 320 may include a first level sensor 321 and a second level sensor 322. The first level sensor 321 may detect a first level of oil stored in the reservoir 30. In this case, the first level may be predetermined and may be predetermined as a value for estimating the occurrence of a leak in oil stored in the reservoir 30. Alternatively, the first level may be determined as an upper limit of the liquid level of oil stored in the reservoir 30.

When the oil stored in the reservoir 30 is at the predetermined first level, the first level sensor 321 may output a detection signal. An output value of the first level sensor 321 is delivered to the electronic control unit 300 and may be used as a control basis.

The second level sensor 322 may detect a second level of oil stored in the reservoir 30. In this case, the second level may be predetermined and may be determined to have a predetermined interval from the first level. Alternatively, the second level may be determined as the lower limit of the liquid level of oil stored in the reservoir 30.

When the oil stored in the reservoir 30 is at a predetermined second level, the second level sensor 322 may output a detection signal. An output value of the second level sensor 332 is delivered to the electronic control unit 300 and may be used as a control basis.

The motor driving unit 340 drives the motor (M) 120 to rotate forward or reverse depending on a control signal from the electronic control unit 300.

The valve driving unit 350 operates at least one valve V of the electronic brake system 1 depending on a control signal from the electronic control unit 300. In this case, the valve driving unit 350 may operate at least one valve in the electronic brake system 1 differently from each other based on the braking mode.

The electronic control unit 300 may be implemented as a memory that stores data on an algorithm for performing overall control of the electronic brake system or a program that reproduces the algorithm, and a processor for performing operations necessary for controlling the electronic brake system by using the data stored in the memory. In this case, the memory and the processor may be implemented as a separate chip, respectively. Alternatively, the memory and the processor may be implemented as a single chip.

The electronic control unit 300 calculates a driver request target pressure, which is a target pressure requested by the driver, from a pedal displacement detected through the pedal displacement sensor 11.

The electronic control unit 300 controls the hydraulic pressure supply device 100 depending on the pressure in the hydraulic circuits 201 and 202 detected through the pressure sensor (not shown) to control the hydraulic pressure transferred to the wheel cylinders 40. Specifically, the electronic control unit 300 may control an amount of brake fluid and a discharge speed discharged from the wheel cylinder 40 by adjusting an advance distance and an advance speed of the hydraulic piston 114.

The electronic control unit 300 controls various valves included in the electronic brake system including the motor 120 using displacement information of the brake pedal 10 detected through the pedal displacement sensor 11, pressure information of the hydraulic circuits 201 and 202 detected through the pressure sensor (not shown), and pressure information of each of the wheel cylinders 40.

In the boosting mode, the electronic control unit 300 detects displacement of the brake pedal 10 through the pedal displacement sensor 11, calculates the driver request target pressure based on the detected brake pedal displacement, sets the calculated driver request target pressure as a target pressure of the hydraulic circuits 201 and 202, and generates hydraulic pressure by moving the hydraulic piston 114 using the rotational force of the motor 120 so that the pressure of the hydraulic circuits 201 and 202 reaches the set target pressure, thereby performing boosting braking.

When a system error occurs in the boosting mode or the initial state, the electronic control unit 300 converts the current mode to the fall back mode to perform emergency braking.

For example, when oil leakage occurs, such as oil leakage from the hydraulic pressure supply device or the hydraulic control device, and oil leakage from components provided on the hydraulic circuits connecting the master cylinder and the wheel cylinders, the electronic control unit 300 may perform emergency braking.

In order to detect such leak conditions, conventionally, the amount of oil in the reservoir is detected using a single level sensor installed inside the reservoir. Accordingly, according to a conventional brake system, only the amount of oil in the reservoir that is less than a reference oil amount may be detected, but the trend of decreasing the amount of oil in the reservoir may not be grasped.

Therefore, in the conventional brake system, it is necessary to prepare for a leak situation by setting a reference oil amount as a reference for converting the braking mode to the fall back mode relatively high. For this reason, because although the amount of oil remaining in the reservoir is sufficient to generate an excess braking force, the braking mode is converted to the fall back mode early, a braking force as intended by the driver may not be generated.

Accordingly, there is a need to appropriately set the time point at which the braking mode is converted to the fall back mode and to efficiently utilize the remaining oil amount by grasping the trend of decreasing the amount of oil in the reservoir even in a leak situation.

Hereinafter, a detailed operation of the electronic control unit 300 according to an embodiment will be described with reference to FIGS. 3 and 4.

Figure 3:
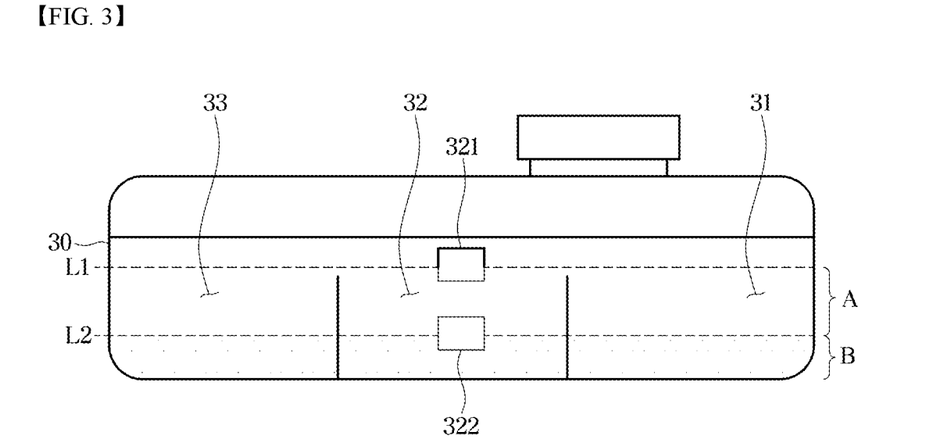
FIG. 3 is a view illustrating an example of a level sensing device disposed in a reservoir in the electronic brake system according to an embodiment.

FIG. 3 is a view illustrating an example of a level sensing device disposed in a reservoir in the electronic brake system according to an embodiment. FIG. 4 is a view for explaining the operation of an electronic control unit in the electronic brake system according to an embodiment.

Referring to FIG. 3, the level detection device 320 of the electronic brake system according to an embodiment may be disposed in the second reservoir chamber 32 of the reservoir 30.

The level detection device 320 may be implemented to include the first level sensor 321 and the second level sensor 322.

In this case, the first level sensor 321 may be disposed at an upper portion inside the second reservoir chamber 32, and the second level sensor 322 may be disposed a lower portion inside the second reservoir chamber 32.

The first level sensor 321 and the second level sensor 322 may be disposed inside the second reservoir chamber 32 at a predetermined interval in a vertical direction.

The first level sensor 321 may be disposed at a position capable of detecting a first level L1 of oil stored in the second reservoir chamber 32, and the second level sensor 322 may be disposed at a position capable of detecting a second level L2 of oil stored in the second reservoir chamber 32.

For example, the first level sensor 321 may be disposed at a position capable of detecting the upper limit of the liquid level of oil stored in the second reservoir chamber 32, and the second level sensor 322 may be disposed at a position capable of detecting the lower limit of the liquid level of oil stored in the second reservoir chamber 32.

However, the present disclosure is not limited to the above-described example, and the first level sensor 321 may be disposed at an appropriate position for measuring a water level of the predetermined first level. Likewise, the second level sensor 322 may also be disposed at an appropriate position for measuring a water level of the predetermined second level.

The electronic control unit 300 may perform different control for generating a braking force based on the decrease trend of oil stored in the reservoir 30 determined based on a detection signal of the level detection device 320.

Specifically, the electronic control unit 300 may determine a braking mode based on the decrease trend of oil stored in the reservoir 30 and may control the motor driving unit 340 or the valve driving unit 350 to perform the determined braking mode.

In this case, the braking mode may include a mode for generating a braking force such as the boosting mode and fall back mode described above. In addition, the electronic control unit 300 may differently control at least one component in the electronic brake system based on the decrease trend of oil stored in the reservoir 30.

The electronic control unit 300 may limit at least one additional function based on the decrease trend of oil stored in the reservoir 30. The braking mode may vary depending on the limited additional function.

In addition, the electronic control unit 300 may drive the motor 120 to move the hydraulic piston 114 within a stroke range of the hydraulic piston 114 determined based on the decrease trend of oil stored in the reservoir 30. The electronic control unit 300 may control at least one of the speed and rotation amount of the motor 120 so that the hydraulic piston 114 moves within the determined stroke range.

To this end, the electronic control unit 300 may determine the decrease trend of oil stored in the reservoir 30 based on the detection signal of the level detection device 320. In this case, the oil decrease trend may include at least one of a reduction rate and a reduction amount of oil stored in the reservoir 30. The reduction amount of oil may refer to the amount of oil reduction according to the amount of liquid required. The electronic control unit 300 may grasp a trend of decrease in the amount of oil in the reservoir 30 according to the detection signal of the first level sensor 321 and the detection signal of the second level sensor 322.

Specifically, the electronic control unit 300 may determine a leak time from a time point when the amount of oil at the first level stored in the reservoir 30 is detected by the first level sensor 321 to a time point when the amount of oil at the second level stored in the reservoir 30 is detected by the second level sensor 322, and may determine an oil decrease trend based on the leak time.

The electronic control unit 300 may determine a leak amount A from the time point when the amount of oil at the first level stored in the reservoir 30 is detected by the first level sensor 321 to the time point when the amount of oil at the second level stored in the reservoir 30 is detected by the second level sensor 322.

The electronic control unit 300 may determine an oil reduction amount according to a required amount of liquid based on at least one of an accumulated required liquid amount, the leak amount A, and braking information during the leak time.

In this case, the braking information refers to information on at least one configuration for generating a braking force, and may include at least one of a braking time, a number of braking, a braking mode, a braking cycle, and a required amount of liquid. The number of braking may be obtained based on at least one of a number of strokes and a number of direction changes of the hydraulic piston 114. The braking mode may be divided into a low pressure mode and a high pressure mode in the boosting mode described above, but is not limited thereto, and may be divided into one or more modes in which the hydraulic control device 200 and the hydraulic pressure supply device 100 operate differently In addition, the braking information may further include driving information such as the rotation speed and stroke value of the motor 120, information on the stroke value or position of the hydraulic piston 114, information on a change in the area of the first pressure chamber 112 or the second pressure chamber 113, or the like.

Specifically, the electronic control unit 300 may determine an oil reduction amount according to a required liquid amount based on at least one of the required liquid amount accumulated during the leak time, a leak amount A, and braking information, and may determine an oil reduction rate according to the required liquid amount based on the oil reduction amount.

To this end, the electronic control unit 300 may determine an accumulated amount of required liquid from an accumulated retreat amount of the hydraulic piston 114 compared to an advance amount of the hydraulic piston 114 and an accumulated amount of required liquid from a change in the area of the first pressure chamber 112 (or a change in the area of the second pressure chamber 113) according to the backward movement, due to oil leakage from when the first level L1 in the reservoir 30 is detected by the first level sensor 321 to when the second level L2 is detected by the second level sensor 322.

The electronic control unit 300 may determine a boosting possible time based on the decrease trend of the amount of oil in the reservoir 30 described above. In this case, the boosting possible time may refer to a time until the boosting possible required liquid amount is exhausted in consideration of an oil reduction rate (i.e., leak rate).

To this end, the electronic control unit 300 may determine an oil reduction rate according to the required liquid amount based on the oil reduction amount and the leak time according to the determined required liquid amount. The electronic control unit 300 may determine the boosting possible time based on the oil reduction rate according to the required amount of liquid.

Specifically, the electronic control unit 300 may determine a boosting possible required liquid amount B based on the leak time from the time point when the amount of oil at the first level stored in the reservoir 30 is detected by the first level sensor 321 to the time point when the amount of oil at the second level stored in the reservoir 30 is detected by the second level sensor 322. The electronic control unit 300 may determine the boosting possible time based on the boosting possible required liquid amount B and the oil reduction rate according to the required amount of liquid.

For example, the electronic control unit 300 may calculate an oil reduction amount according to the required amount of liquid from a time point from when the upper limit of the amount of oil stored in the reservoir 30 is detected by the first level sensor 321 to a time point when the lower limit of the amount of oil stored in the reservoir 30 is detected by the second level sensor 322. The electronic control unit 300 may calculate a reduction rate of oil in the reservoir 30 and a boosting possible required liquid amount based on the oil reduction amount according to the required amount of liquid calculated and the time from the upper limit to the lower limit, and may calculate the boosting possible time according to the calculated reduction rate of oil and the boosting possible required liquid amount.

When the boosting possible required liquid amount B is determined, the electronic control unit 300 may secure an additional braking force based on the boosting possible required liquid amount B. Specifically, the electronic control unit 300 may control the hydraulic pressure supply device 100 or the hydraulic control device 200 to generate an additional braking force based on the boosting possible required liquid amount B.

Figure 4:
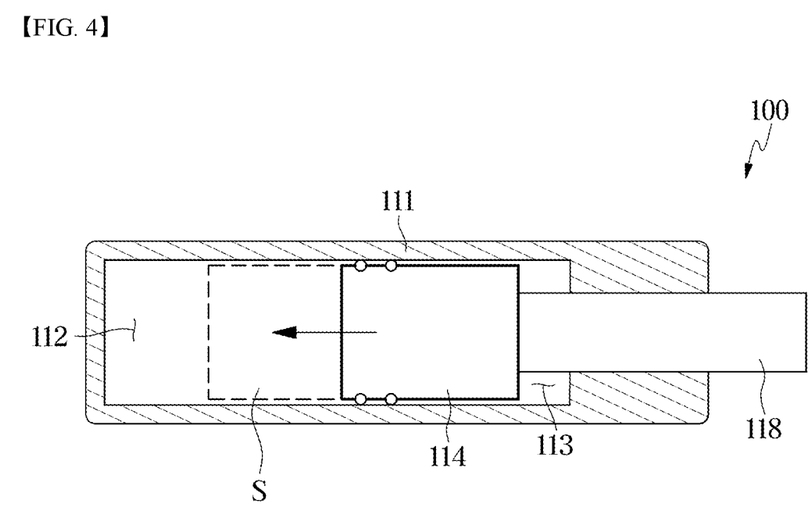
FIG. 4 is a view for explaining the operation of an electronic control unit in the electronic brake system according to an embodiment.

As illustrated in FIG. 4, the electronic control unit 300 may control the movement of the hydraulic piston 114 to change the required liquid amount in the first pressure chamber 112 or the second pressure chamber 113 by a volume S corresponding to the boosting possible required liquid amount (B in FIG. 7). For example, the volume of the boosting possible required liquid amount B may be the same as the volume of the required liquid amount in the first pressure chamber 112 changed by the control of the electronic control unit 300.

The volume S corresponding to the boosting possible required liquid amount (B in FIG. 3) may also be expressed as the stroke range of the hydraulic piston 114. The electronic control unit 300 may determine the stroke range of the hydraulic piston 114 based on the boosting possible required liquid amount (B in FIG. 3) and may control the motor 120 to secure an additional braking force based on the determined stroke range.

In this case, the electronic control unit 300 may determine the stroke range of the hydraulic piston 114 on the bases of the boosting possible required liquid amount determined based on a decrease trend in the amount of oil stored in the reservoir 30 and the volume of the first pressure chamber 112 or the second pressure chamber 113.

Or, the electronic control unit 300 may control the motor 120 to move the hydraulic piston 114 within the determined stroke range of the hydraulic piston 114. That is, when a leak occurs, the electronic control unit 300 may control the movement of the hydraulic piston 114 so that braking is performed within a boosting possible required liquid amount.

When oil stored in the reservoir 30 leaks, the electronic control unit 300 may limit at least one additional function based on the decrease trend in the amount of oil. In this case, the additional function refers to a function that may affect the required amount of liquid, and may include an ABS function, an ESC function, and the like. However, the present disclosure is not limited thereto, and when functions are provided, various functions in which a change in the required amount of liquid is expected may be provided.

Limiting an additional function may include prohibiting the additional function to be provided, or reducing the performance of the provided additional function. Prohibiting an additional function means not providing the additional function by stopping the executing additional function or deactivating the additional function that is not executed.

The electronic control unit 300 may determine a limiting function among one or more additional functions that cause a change in the required amount of liquid based on the decrease trend in the amount of oil and may limit the determined limiting function.

To this end, before performing emergency braking, the electronic control unit 300 may change the braking mode based on the decrease trend in the amount of oil in the reservoir 30 even in an oil leakage situation. The electronic control unit 300 may limit provision of at least one additional function based on the changed braking mode. Specifically, the electronic control unit 300 may perform a degraded boosting mode in which the braking performance of the boosting mode is lowered during the determined boosting possible time. That is, the electronic control unit 300 may reduce braking performance in the boosting mode by prohibiting at least one additional function during the determined boosting possible time. In this case, the degraded boosting mode means a mode in which provision of at least one additional function is limited.

Accordingly, because boosting braking with reduced braking performance is possible during the boosting possible time, even when oil leakage occurs, a braking force may be secured to the maximum.

The degraded boosting mode may include a first degraded boosting mode in which a change in the required amount of liquid is minimized in the boosting mode.

The electronic control unit 300 may not perform an automatic control function such as ABS control and ESC control in the first degraded boosting mode. However, the present disclosure is not limited thereto, and when functions are provided, various functions for which a change in the required amount of liquid is expected may not be performed.

That is, the electronic control unit 300 may minimize a change in the required amount of liquid by performing the first degraded boosting mode in which at least one additional function is limited. Accordingly, in estimating a leak rate based on an output value of the level detection device 320, the change in the required amount of liquid is minimized, so that a more accurate leak rate estimation is possible.

When the first level of oil stored in the reservoir 30 is detected, the electronic control unit 300 may change the braking mode from the boosting mode to the first degraded boosting mode.

When the first level of oil stored in the reservoir 30 is detected, the electronic control unit 300 executes the first degraded boosting mode and may perform the first degraded boosting mode until the second level is detected.

For example, when the upper limit of the reservoir 30 is detected in the boosting mode, the electronic control unit 300 may perform the first degraded boosting mode in which ABS control is prohibited in the boosting mode until the lower limit of the reservoir 30 is detected. In this case, the first degraded boosting mode may be performed by being divided into the low pressure mode and the high pressure mode. In the first degraded boosting mode, when an additional function is not performed, the electronic control unit 300 may warn the driver by visually or aurally notifying the driver of information on the function not provided. The degraded boosting mode may further include a second degraded boosting mode in which the required amount of liquid is minimized in the boosting mode.

Specifically, the electronic control unit 300 may perform the second degraded boosting mode by limiting the maximum pressure, a motor speed, or a pressurization method in the boosting mode to minimize the required amount of liquid. For example, in the second degraded boosting mode, the electronic control unit 300 may limit the pressurization method to a forward pressurization method by performing only the forward pressurization method without performing a backward pressurization method.

Or, in the second degraded boosting mode, the electronic control unit 300 may block a circuit in which oil leaks. In this case, the circuit through which oil leaks may be a circuit in which oil leaks among the hydraulic circuit in the hydraulic pressure supply device 100 and the first hydraulic circuit 201 and the second hydraulic circuit 202 of the hydraulic control device 200.

When the second level of oil stored in the reservoir 30 is detected, the electronic control unit 300 may change the braking mode from the first degraded boosting mode to the second degraded boosting mode.

When the second level of the oil stored in the reservoir 30 is detected, the electronic control unit 300 executes the second degraded boosting mode and may perform the second degraded boosting mode during the boosting possible time.

For example, when the lower limit of the reservoir 30 is detected in the boosting mode, the electronic control unit 300 may limit the maximum pressure (or target hydraulic circuit pressure), the motor speed or the pressurization method (high pressure mode→low pressure mode) in the boosting mode during the boosting possible time, or may perform the second degraded boosting mode in which braking performance is more lowered than the first degraded boosting mode by blocking a circuit in which oil leaks. The second degraded boosting mode may be performed by performing at least one operation among a maximum pressure limit, a motor speed limit, a pressurization method limit, and an oil leakage circuit blocking in the boosting mode.

In addition to the above-described operations, when performing the first degraded boosting mode or the second degraded boosting mode, the electronic control unit 300 may adjust a parameter for a braking algorithm when a leak occurs by the pressure sensor 41. Through this, when a leak occurs, braking control by the pressure sensor 41 may also be efficiently performed.

In addition, when oil in the reservoir 30 leaks, the electronic control unit 300 may warn the driver that leakage of the oil in the reservoir 30 has occurred.

Thereafter, when the boosting possible time elapses, the electronic control unit 300 may perform emergency braking by converting the degraded boosting mode to the fall back mode. In other words, the electronic control unit 300 may determine that a time point in which the boosting possible time elapses from the time point in which the second level of oil stored in the reservoir 30 is detected is a time point to be converted to the fall back mode.

Through this, because the amount of oil remaining in the reservoir 30 is used to generate a spare braking force and then the converting to the fall back mode is performed, a braking force of a degree intended by the driver may be generated. Therefore, the efficiency of braking may be increased.

Figure 5:
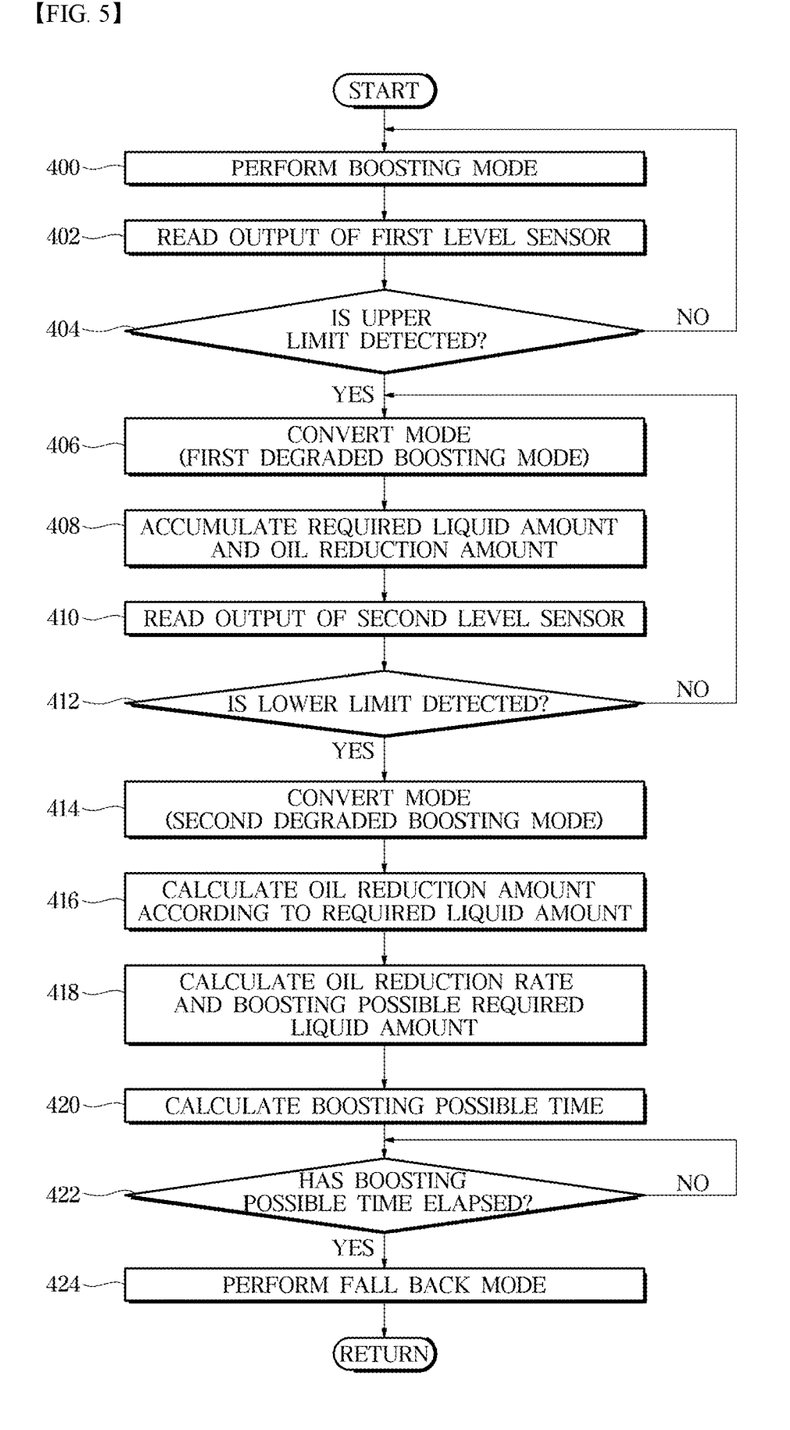
FIG. 5 is a control flow diagram for a control method of the electronic brake system according to an embodiment.

FIG. 5 is a control flow diagram for a control method of the electronic brake system according to an embodiment.

Referring to FIG. 5, the electronic control unit 300 performs the boosting mode by detecting a displacement of the brake pedal 10 through the pedal displacement sensor 11, calculating a target pressure required by the driver based on the detected brake pedal displacement, setting the calculated target pressure required by the driver as a target pressure of the hydraulic circuits 201 and 202, and generating hydraulic pressure by moving the hydraulic piston 114 using the rotational force of the motor 120 so that the pressures in the hydraulic circuits 201 and 202 reach the set target pressure (400).

The electronic control unit 300 reads an output signal of the first level sensor 321 from the first level sensor 321 while performing the boosting mode (402).

The electronic control unit 300 determines whether the upper limit of the reservoir 30 is detected according to the read output signal of the first level sensor (404).

When the upper limit of the reservoir 30 is not detected as a result of the determination of the operation mode 404, it is returned to the operation mode 400 so that the previous operation modes are performed.

When the upper limit of the reservoir 30 is detected as a result of the determination of the operation mode 404, the electronic control unit 300 converts the boosting mode in operation to the first degraded boosting mode with more limited braking performance than the boosting mode (406). The first degraded boosting mode is a mode in which a change in a required amount of liquid is minimized in the boosting mode, and may be a mode in which ABS control or ESC control is prohibited in the boosting mode. However, the first degraded boosting mode is not limited thereto, and when functions are provided, may be a mode in which at least one additional function in which a change in required liquid amount is expected is limited.

The electronic control unit 300 accumulates a required liquid amount and an oil reduction amount from when the upper limit of the reservoir 30 is detected by the first level sensor 321 to when the lower limit of the reservoir 30 is detected by the second level sensor 322 (408).

The electronic control unit 300 reads an output signal of the second level sensor 322 from the second level sensor 322 (410).

The electronic control unit 300 determines whether the lower limit of the reservoir 30 is detected according to the read output signal of the second level sensor (412).

When the lower limit of the reservoir 30 is not detected as a result of the determination of the operation mode 412, it is returned to the operation mode 406 so that the previous operation modes are performed.

When the lower limit of the reservoir 30 is detected as a result of the determination of the operation mode 412, the electronic control unit 300 converts the first degraded boosting mode in operation to the second degraded boosting mode with more limited braking performance than the first degraded boosting mode (414). The second degraded boosting mode is a mode in which a required amount of liquid is minimized in the boosting mode, and may be a mode in which the maximum pressure (or target hydraulic circuit pressure), the motor speed or the pressurization method (high pressure mode→low pressure mode) in the boosting mode is limited, or a circuit in which oil leaks is blocked.

The motor speed may be limited based on an oil reduction rate. Specifically, the electronic control unit 300 may rotate at least one of the speed and rotation amount of the motor 120 so that the hydraulic piston 114 moves within the stroke range of the hydraulic piston 114 determined based on the oil reduction rate.

The electronic control unit 300 calculates an oil reduction amount according to a required liquid amount based on the required liquid amount and the oil reduction amount accumulated from when the upper limit of the reservoir 30 is detected by the first level sensor 321 to when the lower limit of the reservoir 30 is detected by the second level sensor 322 (416).

The electronic control unit 300 calculates an oil reduction rate in the reservoir 30 and a boosting possible required liquid amount based on the oil reduction amount according to the calculated required liquid amount and the time from the detection of the upper limit to the detection of the lower limit (418).

The electronic control unit 300 calculates a boosting possible time according to the calculated oil reduction rate and the boosting possible required liquid amount (420).

The electronic control unit 300 determines whether the calculated boosting possible time has elapsed (422).

When the boosting possible time calculated as a result of the determination of the operation mode 422 elapses, the electronic control unit 300 performs the fall back mode so that emergency braking may be executed (424).

As such, because the boosting braking with lowered braking performance may be performed to the maximum, taking into account a decrease trend in the amount of oil in the reservoir due to oil leakage, compared to the amount of oil remaining in the reservoir, the current mode may be prevented from being converted to the fall back mode early, so that a braking force may be secured to the maximum. Herein, the disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes various kinds of recording media in which instructions which may be decrypted by a computer are stored. For example, there may be a ROM (Read Only Memory), a RAM (Random Access Memory), a magnetic tape, a magnetic disk, a flash memory, an optical data storage device, and the like.

The foregoing has illustrated and described specific embodiments. However, it should be understood by those of skilled in the art that the disclosure is not limited to the above-described embodiments, and various changes and modifications may be made without departing from the technical idea of the disclosure described in the following claims. The disclosed embodiments are illustrative and should not be construed as limiting.

The invention claimed is:

1. A control method of a brake system comprising a reservoir in which oil is stored, wherein the control method comprises:
    detecting a first level of a liquid level of oil stored in the reservoir;
    detecting a second level of the liquid level of oil stored in the reservoir;
    determining a decrease trend of an oil amount stored in the reservoir based on a time point when the first level is detected and a time point when the second level is detected;
    determining a boosting possible time based on the decrease trend of the oil amount in the reservoir; and
    limiting at least one additional function based on the decrease trend of the oil amount,
    wherein the limiting at least one additional function comprises limiting the at least one additional function based on the boosting possible time.

2. The control method according to claim 1, wherein the limiting the at least one additional function comprises determining one of at least one additional function causing a change in a required liquid amount as a limiting function based on the decrease trend of the oil amount and limiting the determined limiting function.

3. The control method according to claim 1, wherein the limiting the at least one additional function comprises limiting at least one automatic control function when the first level is detected.

4. The control method according to claim 1, wherein the determining the boosting possible time comprises:
determining an oil reduction amount according to a required liquid amount from a time point when the first level is detected to a time point when the second level is detected; and
determining the boosting possible time based on the oil reduction amount according to the required liquid amount.

5. The control method according to claim 1, wherein the determining the boosting possible time comprises:
determining at least one of an oil reduction rate of the reservoir and a boosting possible required liquid amount based on an oil reduction amount according to a required liquid amount from a time point when the first level is detected to a time point when the second level is detected; and
determining the boosting possible time based on at least one of the determined oil reduction rate and boosting possible required liquid amount.

6. The control method according to claim 1, wherein the determining the boosting possible time comprises:
accumulating a required liquid amount and an oil reduction amount from a time point when the first level is detected to a time point when the second level is detected; and
determining the oil reduction amount according to the required liquid amount based on at least one of the accumulated required liquid amount and oil reduction amount, and braking information.

7. The control method according to claim 6, wherein the braking information comprises at least one of a braking time, a number of braking, a braking mode, and a braking cycle.

8. The control method according to claim 1, further comprising
performing a fall back mode using a pressure in a master cylinder generated by a brake pedal operation of a driver after the boosting possible time.

9. A control method of a brake system comprising a reservoir in which oil is stored and a hydraulic pressure supply device to generate hydraulic pressure by moving a piston using a rotational force of a motor, wherein the control method comprises:
detecting a first level of a liquid level of oil stored in the reservoir;
detecting a second level of the liquid level of oil stored in the reservoir;
determining a decrease trend of an oil amount stored in the reservoir based on a time point when the first level is detected and a time point when the second level is detected; and
driving the motor to move the piston within a stroke range of the piston determined based on the decrease trend of the oil amount,
wherein the driving the motor comprises determining a boosting possible required liquid amount based on the decrease trend of the oil amount, and determining the stroke range of the piston based on the determined boosting possible required liquid amount.

10. The control method according to claim 9, wherein the driving the motor comprises controlling at least one of a speed or a rotation amount of the motor so that the piston moves within the stroke range.

11. The control method according to claim 9, further comprising
limiting at least one of a maximum pressure, a pressurization method and a speed of the motor when the second level is detected.

12. The control method according to claim 9, further comprising
blocking a circuit in which a leak occurs when the second level is detected.

13. The control method according to claim 9, further comprising
determining a boosting possible time based on the decrease trend of the oil amount in the reservoir,
wherein the driving the motor comprises driving the motor to move the piston within a stroke range of the piston during the boosting possible time.

14. The control method according to claim 13, wherein the determining the boosting possible time comprises:
determining an oil reduction amount according to a required liquid amount from a time point when the first level is detected to a time point when the second level is detected; and
determining the boosting possible time based on the oil reduction amount according to the required liquid amount.

15. An electronic brake system comprising:
a reservoir in which oil is stored;
a master cylinder connected to the reservoir to discharge oil according to a pressing force of a brake pedal;
a hydraulic pressure supply device configured to generate hydraulic pressure by moving a piston using a rotational force of a motor and supply the generated hydraulic pressure to a wheel cylinder provided on each of wheels;
a hydraulic control device configured to transfer the hydraulic pressure discharged from the hydraulic pressure supply device to the wheel cylinder provided on each of the wheels;
a first level sensor to detect a first level of a liquid level of oil stored in the reservoir;
a second level sensor to detect a second level of the liquid level of oil stored in the reservoir; and
an electronic control unit configured to determine a decrease trend of an oil amount in the reservoir based on detection signals from the first level sensor and the second level sensor, determine a boosting possible time based on the decrease trend of the oil amount in the reservoir, limit at least one additional function based on the decrease trend of the oil amount, and control the motor based on the decrease trend of the oil amount when the second level is detected,
wherein the electronic control unit limits at least one additional function based on the boosting possible time.

* * * * *